March 31, 1970 R. L. ALEXANDER ET AL 3,503,486

LID CONVEYOR SYSTEM

Filed June 7, 1968 2 Sheets-Sheet 1

INVENTORS
Richard L. Alexander
Calvin C. Baker
Richard G. Schmid

BY

ATTORNEY

March 31, 1970  R. L. ALEXANDER ET AL  3,503,486

LID CONVEYOR SYSTEM

Filed June 7, 1968  2 Sheets-Sheet 2

INVENTORS
Richard L. Alexander
Calvin C. Baker
Richard G. Schmid

BY

ATTORNEY

United States Patent Office 3,503,486
Patented Mar. 31, 1970

3,503,486
LID CONVEYOR SYSTEM
Richard L. Alexander and Calvin C. Baker, Greensburg, and Richard G. Schmid, Osgood, Ind., assignors to Gulf Oil Corporation, Pittsburgh, Pa., a corporation of Pennsylvania
Filed June 7, 1968, Ser. No. 735,442
Int. Cl. B65g 47/24
U.S. Cl. 198—33                5 Claims

ABSTRACT OF THE DISCLOSURE

Apparatus and method for conveying lids from injection molding machine to inspection and packing point comprise a collection chute which catches the injection molded lids as they drop from the mold, stands them on edge and presents them all facing in the same direction on the conveyor belt which conveys them to a discharge chute having a lower offset opening which presents them to a spinner apparatus still facing in the same direction and spinning for inspection and packing still facing in the same direction.

BACKGROUND OF INVENTION

This invention relates to a method and apparatus for conveying lids from the point of discharge from a multiple mold to a horizontal stack position with all lids facing the same direction.

In all previously known methods and apparatus for collecting lids, such as polyethylene overcaps, from injection molding machines and conveying them to an inspection and packing point one or more of the following problems existed. The lids fell from the injection molding equipment in a random fashion alighting on the conveyor belt in various positions some facing top up and some facing top down. Then, as the lids are delivered to the spinner rods for inspection and packing, those that were presented to the spinner with the tapered skirt facing away from the packing and inspection end of the spinner tended to back up and bounce out of the spinner conveyor apparatus. This was because the lids traveled in the direction of the taper as shown in FIGURES 2, 3 and 7 of the drawings. Also, the spinner direction could not be reversed because it could be placed only in one position at the end of the conveyor belt. Because of this bouncing out of the spinner conveyor apparatus, as many as 30% of the lids often fell to the floor. When food use is contemplated for the lids, this meant that scrap rate was 30%, and required excessive manpower to pick up lids scattered about the area.

SUMMARY OF THE INVENTION

It has been discovered that a novel collection chute-guide chute can be used to present all the lids facing top down on a conveyor belt. This collection chute and guide chute is combination with a discharge chute at the opposite end of the conveyor belt presents the lids all facing in the same direction with a rotation imparted to the lid and thereby prevents the lids from bouncing out of the spinner conveyor apparatus, as was common with prior art apparatus. Thus, the scrap rate is substantially reduced, and manpower costs are also substantially reduced. For example at one plant one inspector-packer can service two injection molding machines whereas formerly two persons were required to service just one machine.

BRIEF DESCRIPTION OF THE DRAWINGS

FIGURE 6 is a cross-section of the connection between the spout of the collection chute and the guide chute.

FIGURE 7 is a cross-sectional view of a typical tapered polyethylene overcap type lid.

DESCRIPTION OF THE PREFERRED EMBODIMENTS

Figure 1:
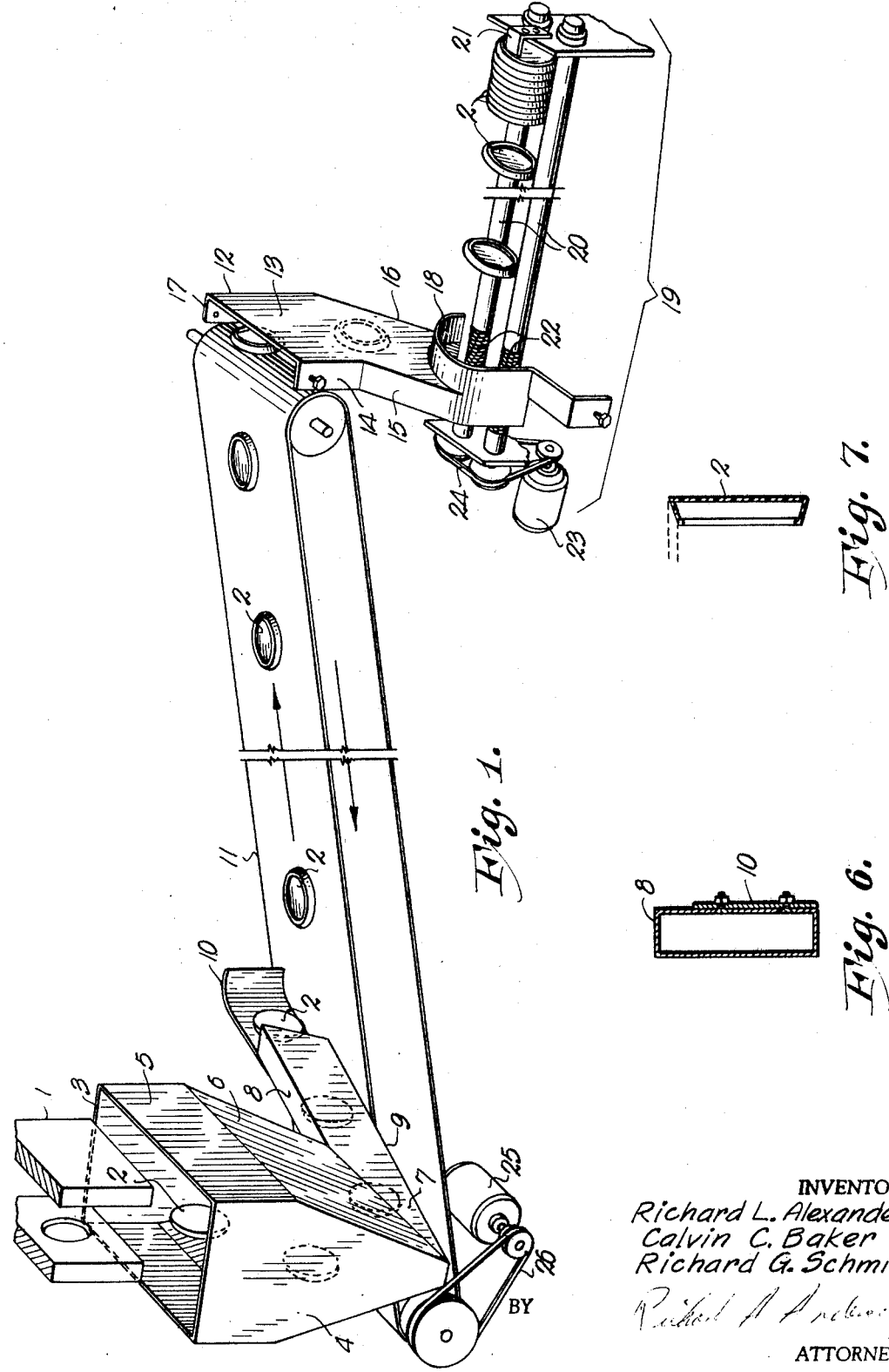
FIGURE 1 is an elevation drawing showing the relationship of all the components of the apparatus.
Figure 2:
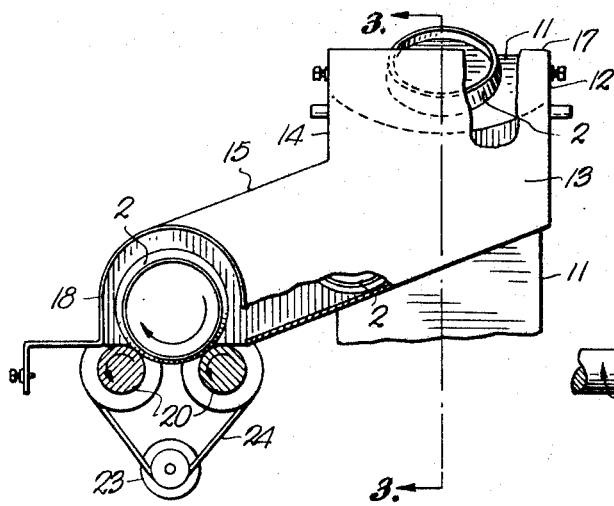
FIGURE 2 is an end view with partial cross-sections of the discharge chute.
Figure 3:
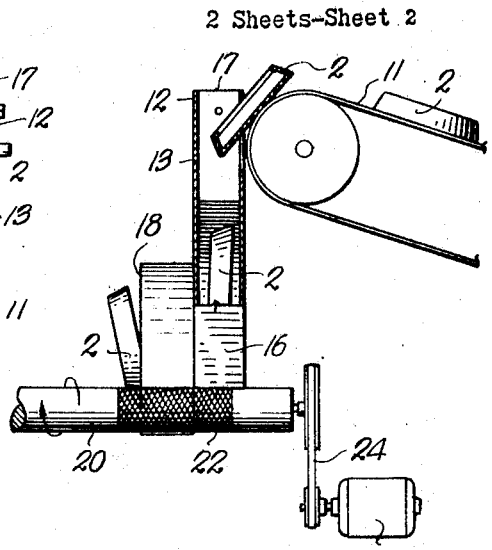
FIGURE 3 is a partial cross-sectional elevation view of the lids coming from the conveyor belt into the discharge chute and being presented to the spinner conveyor.
Figure 4:
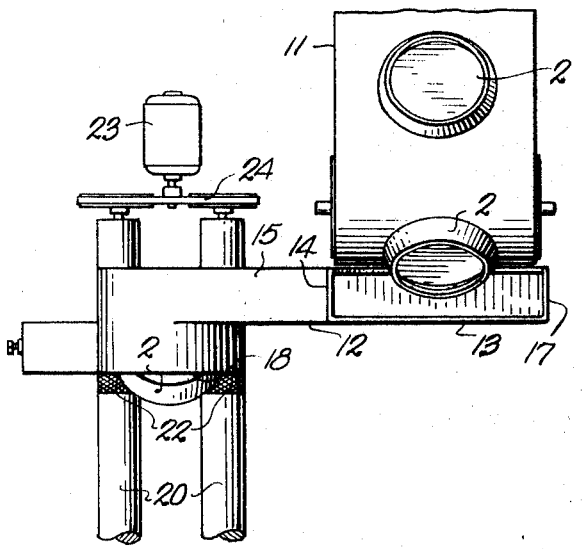
FIGURE 4 is a top view of the end of the conveyor belt, discharge chute and end of the spinner conveyor.
Figure 5:
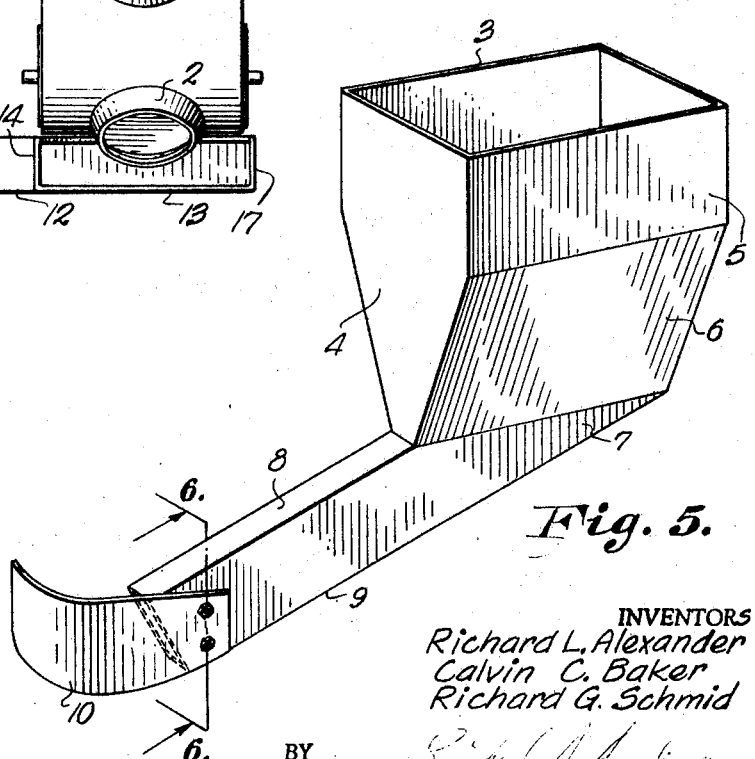
FIGURE 5 shows the collection chute and connected guide chute.

As the multiple molds 1 separate, shown as a partial cross-section in FIGURE 1, the lid 2 drops into the opening of collection chute 3. Collection chute 3 has flat ends 4 and sides having a flat portion 5 near the top, a sloping inwardly portion 6 in the middle and a flat portion 7 at the bottom. The bottom portion 9 slopes downwardly and is especially adapted to stand lids 2 on edge and all facing in the same direction. Collection chute 3 also has a rectangular spout 8 which keeps the lids standing on edge and feeds them to a connected guide chute 10 which is curved and rigid and especially adapted to present the lids to conveyor belt 11 all facing the same direction. Another view of collection chute 3 is found in FIGURE 5 as it is connected to guide chute 10. In place of a conveyor belt any conventional conveyor means could be used. The conveyor belt 11 then conveys the lids 2 to discharge chute 12 also shown in FIGURES 2, 3 and 4. A specially adapted opening 17 in discharge chute 12 receives the lids 2 from conveyor belt 11. Discharge chute 12 has a flat end 13 and sides 14, narrow enough to prevent the lids from turning over either top to bottom or side to side. The top 15 and bottom 16 are downwardly inclined to a second opening 18 offset from and below first opening 17. This opening 18 is especially adapted to discharge the lids 2 still facing in the same direction with a rotation in the same direction as the rods 20 of spinner conveyor 19. Because of the taper of the skirt of the lids 2 as shown in FIGURE 7 the spin imparted to the lids 2 by the spinner conveyor 19 and specifically the rods 20, the lids 2 move to the opposite end of the spinner conveyor 19 until they come to rest against rigid stop 21. Rods 20 can be knurled 22 at opening 18 where they receive lids 2 in order to minimize slipping and bouncing. Any conventional power means can be used on the spinner conveyor and conveyor means 11 for example, electric motor 23 and pulley system 24 on spinner conveyor 19, and electric motor 25 and pulley system 26 on conveyor means 11.

Lids 2 may be taken off in the opposite direction from the discharge chute 12 by putting the opening 18 on the other side of discharge chute 12 and mounting conveyor spinner 19 in the opposite direction. Spinners 20 can revolve at any speed convenient and operable. However, a speed of 500 to 700 r.p.m. for 2 inch rollers is preferred. The width of the bottom of the collection chute 3 and collection chute spout 8 is important, and should be about one inch more than the sum of the thickness of the total number of lids ejected from the mold per cycle.

We claim:

1. Apparatus for conveying lids from the point of discharge from a multiple mold to a horizontal stacked position with all lids facing the same direction comprising:
- (a) a collection chute having a rectangular opening at the top beneath said multiple molds and having flat ends, sides which are flat at the top and slope inwardly to a flat portion at the bottom, said bottom portion adapted to stand said lids on edge, and a downwardly inclined bottom surface, and a downwardly inclined rectangular spout adapted to stand said lids on edge connected to
- (b) a curved, rigid guide chute, adapted to deposit said lids all facing the same direction on, and located just above
- (c) a conveyor means located below said guide chute and extending to
- (d) a discharge chute having flat ends, sides narrow enough to prevent said lids from turning over top to bottom or side to side, and downwardly inclined top and bottom, said discharge chute located with a first opening at the end of said conveyor means opposite said guide chute, said first opening adapted to receive said lids, and a second opening offset from and below said first opening and adapted to discharge said lids all facing the same direction with a rotation in the same direction as, and located just above one end of
- (e) a spinner conveyor having two cylindrical rods mounted in a position spaced from each other in a horizontal plane, and said rods rotating in the same direction so that said lids rotate and become stacked all facing in the same direction at the end opposite said discharge chute, said spinner conveyor also having a rigid stop means at the end, opposite said discharge chute,
- (f) means to move said conveyor means, and
- (g) means to rotate said rods of said spinner conveyor.

2. The apparatus of claim 1 wherein said spinner conveyor rods are knurled where they receive said lids from said discharge chute.

3. The apparatus of claim 1 wherein the bottom portion of said collection chute and said spout of said collection chute are one inch wider than the sum of the thicknesses of the total number of lids ejected from the mold per cycle.

4. A method for conveying lids from the point of discharge from a multiple mold to a substantially horizontal stacked position with all lids facing the same direction comprising:
- (a) collecting the lids at the point of discharge from a multiple mold in a collection chute,
- (b) depositing said lids on a conveyor means with all lids facing the same way,
- (c) conveying said lids to a discharge chute,
- (d) discharging said lids on to a spinner conveyor with a lid rotation in the same direction as the spinner rotates the lids and with all lids facing the same way,
- (e) conveying said lids to stacked, substantially horizontal position with all lids facing the same way for inspection packing, while at the same time
- (f) spinning said lids for inspection of the entire circumference of said lids.

5. The method of claim 4 wherein the spinner conveyor revolves at about 500 to 700 r.p.m., with two inch diameter cylindrical rods.

References Cited
UNITED STATES PATENTS

| | | |
|---|---|---|
| 3,024,889 | 3/1962 | Reading. |
| 3,139,172 | 6/1964 | McClelland et al. |
| 3,392,816 | 7/1968 | Cox. |

ANDRES H. NIELSEN, Primary Examiner